(12) United States Patent
Wu

(10) Patent No.: US 9,103,990 B2
(45) Date of Patent: Aug. 11, 2015

(54) OPTICAL FIBER COUPLER HAVING MALE PORT AND FEMALE PORT

(75) Inventor: Kai-Wen Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 407 days.

(21) Appl. No.: 13/592,627

(22) Filed: Aug. 23, 2012

(65) Prior Publication Data

US 2013/0170796 A1 Jul. 4, 2013

(30) Foreign Application Priority Data

Dec. 28, 2011 (TW) .............................. 100149335 A

(51) Int. Cl.
*G02B 6/38* (2006.01)
*G02B 6/32* (2006.01)

(52) U.S. Cl.
CPC ................ *G02B 6/32* (2013.01); *G02B 6/3882* (2013.01); *G02B 6/3825* (2013.01); *G02B 6/3839* (2013.01); *G02B 6/3846* (2013.01); *G02B 6/3869* (2013.01); *G02B 6/3878* (2013.01); *G02B 6/3885* (2013.01)

(58) Field of Classification Search
CPC ...... G02B 6/32; G02B 6/3885; G02B 6/3878; G02B 6/3869; G02B 6/3825; G02B 6/3839; G02B 6/3882; G02B 6/3846
USPC .......................................................... 385/59
See application file for complete search history.

(56) References Cited

U.S. PATENT DOCUMENTS 7,985,026 B1 * 7/2011 Lin et al. ......................... 385/71

* cited by examiner

*Primary Examiner* — Jerry Blevins
(74) *Attorney, Agent, or Firm* — Novak Druce Connolly Bove + Quigg LLP

(57) ABSTRACT

An optical fiber coupler includes a male port and a female port. The male port includes a main body, the male transmission lens and the male receiving lens positioned on the main body, and a male optical wave guide assembly. The male base board includes at least one male optical wave guide. Each male optical wave guide includes a male first alignment portion and a male second alignment portion. The male first alignment portion is optically coupled with one male receiving lens; and a male second alignment portion has a greater width than that of the male first alignment portion. The structure of the female port is similar to the male port.

8 Claims, 4 Drawing Sheets

OPTICAL FIBER COUPLER HAVING MALE PORT AND FEMALE PORT

BACKGROUND

1. Technical Field

The present disclosure relates generally to optical fiber couplers used for USB interface and connection, especially to an optical fiber coupler having a male port and a female port.

2. Description of Related Art

Optical fiber couplers may be used in electronic devices for transmitting data. A common optical fiber coupler includes a male port and a female port. In use, the male port of one optical fiber coupler is inserted into the female port of another optical fiber coupler, and the lenses of the male port are aligned with the lenses of the female port, thus an optical signal may be transmitted between the female port and the male port. The female port is mounted in an electronic device, such as a computer, a printer, or a camera, for example. The male port is portable, that is, the male port may be brought to the female port, and coupled with the female port to transmit data from the portable electronic device having the male port to the electronic device having the female port. However, offset or misalignment of the insertion positions can easily happen. In addition, displacements or deformations are easily produced after extended usage duration of the male port, and then the female port is thereby optically coupled inaccurately with the deformed male port.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
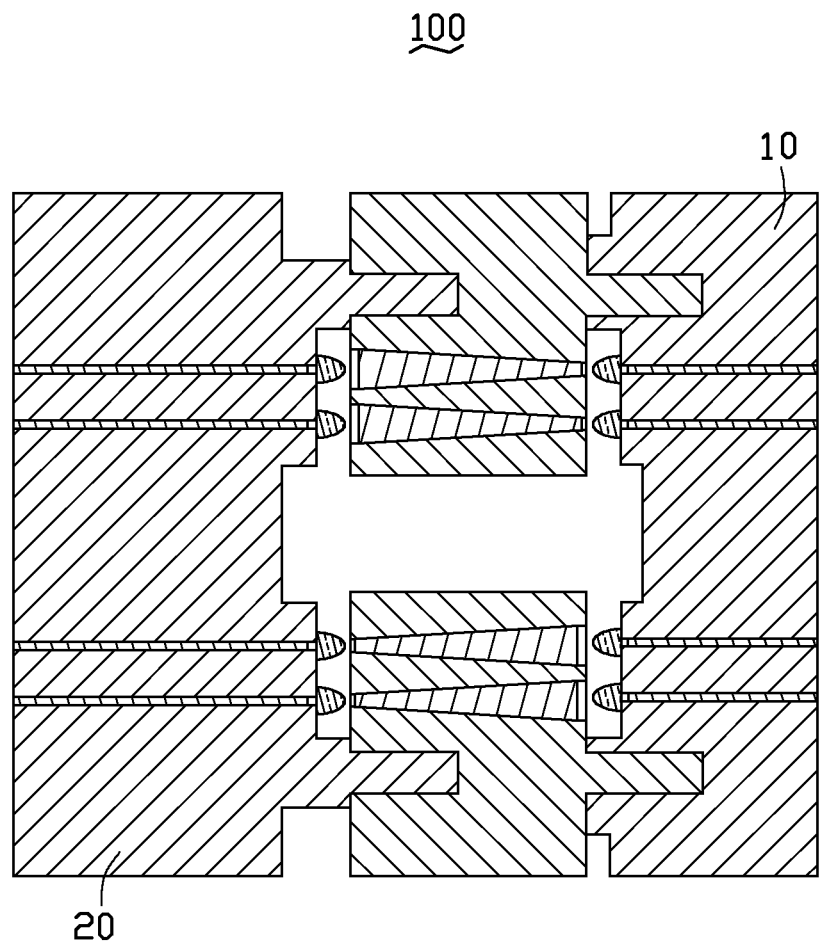
FIG. 1 is a sectional view of one embodiment of an optical fiber coupler including a male port and a female port optically coupled with the male port.
Figure 2:
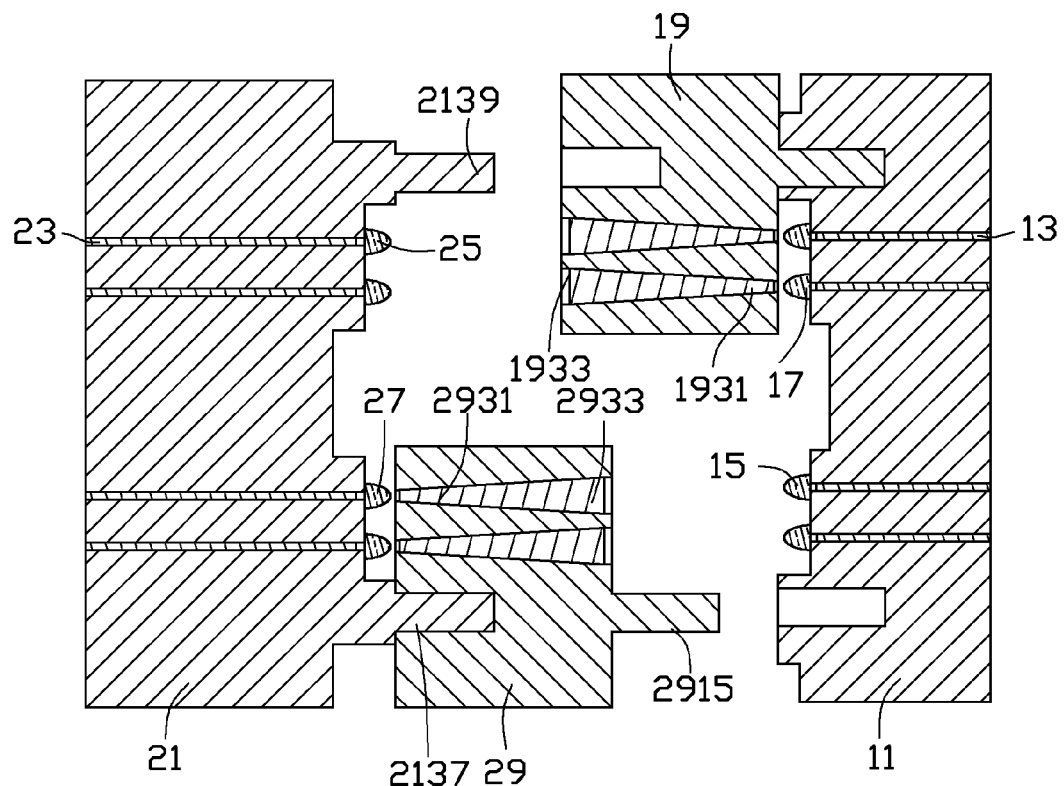
FIG. 2 is a sectional view of the male port and the female port of the optical fiber coupler of FIG. 1.

FIG. 1 and FIG. 2 is a plurality of sectional views of one embodiment of an optical fiber coupler 100. The optical fiber coupler 100 includes a male port 10 and a female port 20 coupling with the male port 10. The female port 20 is mounted in an electronic device (not shown in FIG. 1), such as a computer, a printer, or a camera, for example. The male port 10 is mounted in a portable electronic device, that is, the male port 10 is brought to the female port 20, and may be coupled with the female port 20 which is mounted on the electronic device to transmit data from the electronic device having the female port 20 to the portable electronic device having the male port 10, and vice versa.

Figure 3:
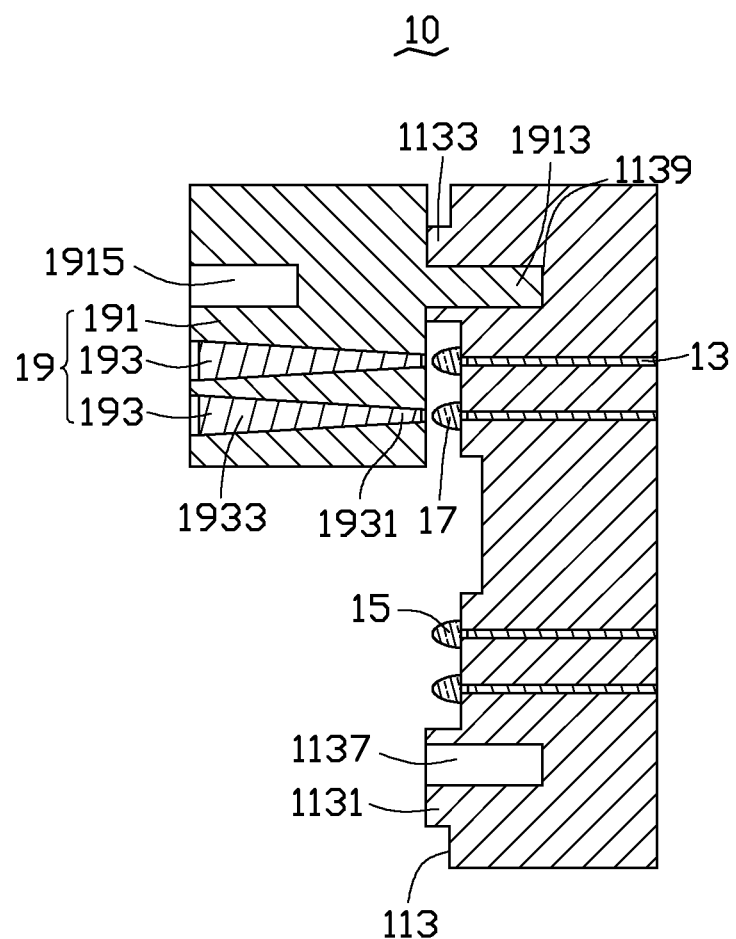
FIG. 3 is a sectional view of the male port shown in FIG. 1.

FIGS. 2 and 3 illustrate the male port 10 in accordance to one embodiment. The male port 10 includes a main body 11, four male optical fibers 13, a pair of male transmission lenses 15, a pair of male receiving lenses 17, and a male optical wave guide assembly 19.

The main body 11 is a substantially rectangular plate. The main body 11 includes a male connecting wall 113. A first insertion portion 1131 and a second insertion portion 1133 perpendicularly protrude out from the opposite ends of the male connecting wall 113. A first insertion hole 1137 and a second insertion hole 1139 are recessed on the first insertion portion 1131 and the second insertion portion 1133, respectively.

Four male optical fibers 13 are divided into two groups. Each group contains two male optical fibers 13. The male optical fibers 13 are positioned between the first insertion portion 1131 and the second insertion portion 1133, passing through the main body 11 and are parallel to each other. One group of the male optical fibers 13 is positioned adjacent to the first insertion portion 1131; another group of the male optical fibers 13 is positioned adjacent to the second insertion portion 1133.

The pair of male transmission lenses 15 are positioned on the connecting wall 113 and are optically coupled with the male optical fibers 13 which are positioned adjacent to the first insertion portion 1131. The pair of male receiving lenses 17 is positioned on the connecting wall 113, and is optically coupled with the two male optical fibers 13 which are positioned adjacent to the second insertion portion 1133. The male transmission lenses 15 and the male receiving lenses 17 are positioned between the first insertion portion 1131 and the second insertion portion 1133.

The male optical wave guide assembly 19 is assembled with the second insertion portion 1133. The male optical wave guide assembly 19 includes a male base board 191 and two male optical wave guides 193 configured to be passing through the male base board 191. The male base board 191 is a substantially rectangular plate. A connecting post 1913 perpendicularly protrudes from one side surface of the male base board 191. The connecting post 1913 is received and fastened in the second insertion hole 1139 of the second insertion portion 1133. A guiding groove 1915 is defined on a side surface of the male base board 191 away from the main body 11. The guiding groove 1915 and the connecting post 1913 are arranged in a line. The two male optical wave guides 193 pass through the male base board 191 corresponding to the two male receiving lenses 17, and are parallel to each other. Each male optical wave guide 193 includes a male first alignment portion 1931 and a male second alignment portion 1933 opposite to the male first alignment portion 1931. The width of the male first alignment portion 1931 is less than that of the male second alignment portion 1933. The male first alignment portion 1931 is arranged to be optically coupled with one corresponding male receiving lens 17. In the illustrated embodiment, the width of the male optical wave guide 193 gradually decreases from the male second alignment portion 1933 to the male first alignment portion 1931.

The number of the male optical fibers 13 positioned in the main body 11 is at least two. Then there is at least one male optical wave guide 193 to optically couple with the corresponding male optical fiber 13 thereof via at least one male receiving lens 17 positioned adjacent to the second insertion portion 1133.

Figure 4:
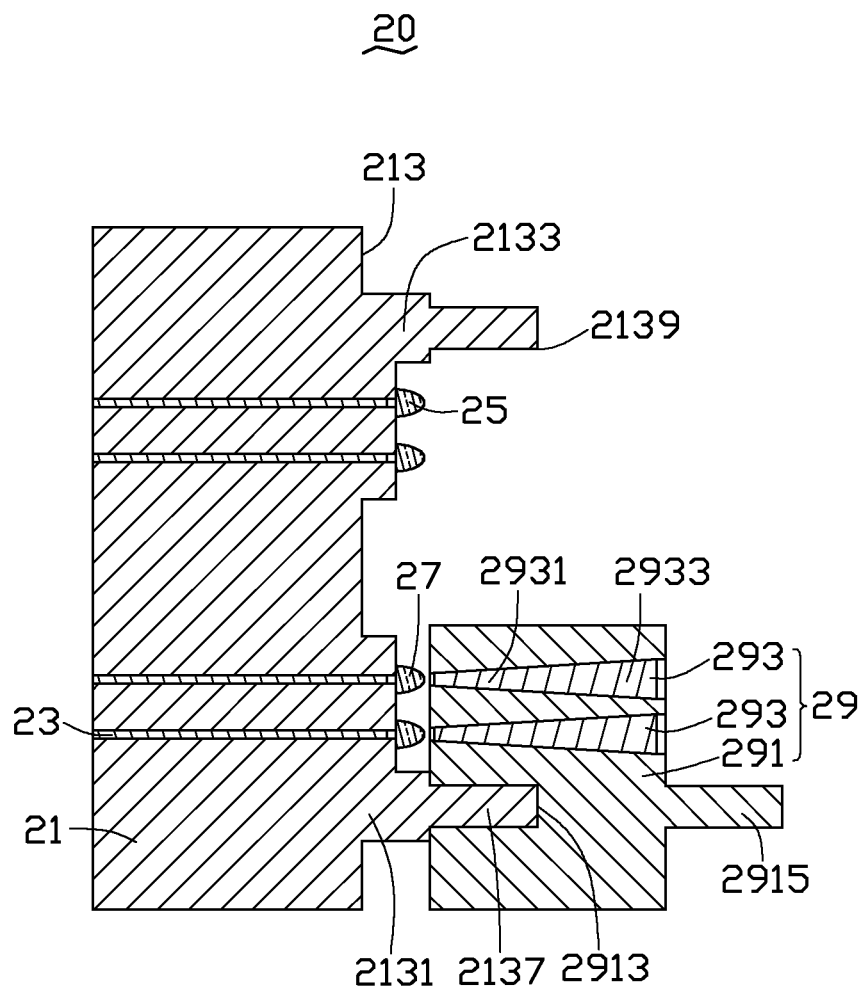
FIG. 4 is a sectional view of the female port shown in FIG. 1.

FIGS. 2 and 4 illustrates the female port 20 in accordance with the embodiment. The female port 20 includes a base body 21, four female optical fibers 23, a pair of female transmission lenses 25, a pair of female receiving lenses 27, and a female optical wave guide assembly 29.

The base body 21 is a substantially rectangular plate. The base body 21 includes a female connecting wall 213. A first plug portion 2131 and a second plug portion 2133 perpendicularly protrude out from the opposite ends of the female connecting wall 213. The first plug portion 2131 and the second plug portion 2133 face towards the first insertion portion 1131 and the second insertion portion 2133, respectively. A first plug post 2137 perpendicularly protrudes out from the first plug portion 2131 toward the male port 10, and a second plug post 2139 is formed on the second plug portion 2133.

Four female optical fibers 23 are divided into two groups. Each group contains two female optical fibers 23. The female optical fibers 23 are positioned between the first plug post 2137 and the second plug post 2139, passing through the base body 21 and are parallel to each other. One group of the female optical fibers 23 is positioned adjacent to the first plug portion 2131; another group of the female optical fibers 23 is positioned adjacent to the second plug portion 2133.

The pair of female transmission lenses 25 are positioned on the female connecting wall 213, and are optically coupled with the female optical fibers 23 which are positioned adjacent to the second plug portion 2133. The pair of female receiving lenses 27 is positioned on the female connecting wall 213, and is optically coupled with the two female optical fibers 23 which are positioned adjacent to the first plug portion 2131. The female transmission lenses 25 and the female receiving lenses 27 are positioned between the first plug portion 2131 and the second plug portion 2133.

The female optical wave guide assembly 29 is coupled to the first plug portion 2131. The female optical wave guide assembly 29 includes a female base board 291 and two female optical wave guides 293 passed through the female base board 291. The female base board 291 is a substantially rectangular plate. A connecting groove 2913 is defined on a surface of the female base board 291 facing the female connecting wall 213. The first plug post 2137 is received in the connecting groove 2913. A guiding post 2915 perpendicularly protrudes from a side surface of the female base board 291 away from the base body 21. The guiding post 2915 is engaged with the first insertion hole 1137. The guiding post 2915 and the connecting groove 2913 are arranged in a line. Two female optical wave guides 293 pass through the female base board 291 corresponding to the two female receiving lenses 27, and are parallel to each other. Each female optical wave guide 293 includes a female first alignment portion 2931 and a female second alignment portion 2933 opposite to the female first alignment portion 2931. The width of the female first alignment portion 2931 is less than that of the female second alignment portion 2933. The female first alignment portion 2931 is aligned and optically coupled with one corresponding female receiving lens 27. In the illustrated embodiment, the width of the female optical wave guide 293 decreases from the female second alignment portion 2933 gradually to the other end of the female first alignment portion 2931. In alternative embodiments, the shape of the male, female optical wave guide 193, 293 may be designed to be sloped, conical or others.

The number of the female optical fibers 23 positioned in the base body 21 is at least two. There is at least one female optical wave guide 293 to optically couple with the corresponding female optical fiber 23 thereof via at least one female receiving lens 27 positioned adjacent to the first plug portion 2131.

In the male port 10 assembly, the connecting post 1913 is firstly inserted into the second insertion hole 1139 and glue is used to strength the connection there between. The two male first alignment portions 1931 are respectively arranged with the two male receiving lenses 17. In the female port 20 assembly, the first plug post 2137 is inserted into the connecting groove 2913 and glue is also used to strength the connection there between. The two female first alignment portions 2931 are respectively arranged with the two female receiving lenses 27.

In use, an end of the male port 10 with the male optical wave guide assembly 19 is aligned with the one end of the female port 20 with the female optical wave guide assembly 29. Then the second plug post 2139 is inserted into the guiding groove 1915 and the guiding post 2915 is received in the first insertion hole 1137. The two male second alignment portions 1933 are arranged with the two female transmission lenses 25 in a line, and optically coupled with the female transmission lenses 25. Meanwhile, the two female second alignment portions 2933 are also optically coupled with the male transmission lenses 15. When the female port 20 needs to transmit data to the male port 10, optical signals from the female optical fiber 23 exit the female transmission lenses 25, then enter the male optical wave guide 193 via the male second alignment portions 1933, and finally reaching the male receiving lenses 17. And the female port 20 is capable of receiving data from the male port 10 with the similar transmission path via the male optical wave guide assembly 19.

The male optical wave guide assembly 19 and the female optical wave guide assembly 29 are coupled with the second insertion portion 1133 and the first plug portion 2131, respectively. When the male port 10 is inserted into the female port 20, the male second alignment portions 1933 are optically coupled with the female transmission lenses 25, and the female second alignment portions 2933 are optically coupled with the male transmission lenses 15. Because of the width of the female, male second alignment portions 2933, 1933 are less than that of the female, male first alignment portions 2931,1931, the precision of the alignment between the male port 10 and the female port 20 will be improved. In addition, the optical coupling ratio of the optical wave guides and the lenses will be improved because the optical signals will be better focused during the transmission.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An optical fiber coupler, comprising:
    a male port comprising:
        a main body comprising a male connecting wall,
        at least one male transmission lens and at least one male receiving lens positioned on the two ends of the male connecting wall; and
        a male optical wave guide assembly comprising a male base board assembled with the male connecting wall, and at least one male optical wave guide comprising a male first alignment portion optically coupled with the at least one male receiving lens, and a male second alignment portion opposite to the male first alignment portion, the width of the male second alignment portion is greater than the width of the male first alignment portion; and
    a female port comprising:
        a base body comprising a female connecting wall,
        at least one female transmission lens and at least one female receiving lens positioned on the two ends of the female connecting wall; and
        a female optical wave guide assembly comprising a female base board assembled with the female connecting wall, at least one female optical wave guide comprising a female first alignment portion optically coupled with the at least one female receiving lens and a female second alignment portion opposite to the female first alignment portion, the width of female second alignment portion is greater than the width of the female first alignment portion, wherein the male second alignment portion is optically coupled with one corresponding female transmission lens, and the female second alignment portion is optically coupled with one corresponding male transmission lens when the male port is engaged with the female port; and the main body further comprises a first insertion portion and a second insertion portion protrude out from the opposite ends of the male connecting wall, the at least one male transmission lens and the at least one male receiving lens are located between the first insertion portion and the second insertion portion.

2. The optical fiber coupler of claim 1, wherein the at least one male transmission lens is positioned adjacent to the first insertion portion, the at least one male receiving lens is positioned adjacent to the second insertion portion, the male base board is assembled with the second insertion portion, the female base board is assembled with the first insertion portion.

3. The optical fiber coupler of claim 2, wherein the first insertion portion comprises a first insertion hole, the female base board further comprises a guiding post protruding from a side surface of the female base board away from the base body, the guiding post is engaged with the first insertion hole.

4. The optical fiber coupler of claim 2, wherein the second insertion portion comprises a second insertion hole, the male base board comprises a connecting post protruding from a side surface facing the main body, the connecting post is engaged with the second insertion hole.

5. The optical fiber coupler of claim 1, wherein the base body further comprises a first plug post and a second plug post protruding out from the opposite ends of the female connecting wall, the at least one female transmission lens and the at least one female receiving lens are located between the first plug post and the second plug post.

6. The optical fiber coupler of claim 5, wherein the at least one female receiving lens is positioned adjacent to the first plug post, the at least one female transmission lens is positioned adjacent to the second plug post.

7. The optical fiber coupler of claim 5, wherein the female base board comprises a connecting groove defined on a side surface of the female base board adjacent to the base body, the first plug post is engaged with the connecting groove.

8. The optical fiber coupler of claim 6, wherein the male base board comprises a guiding groove defined on a side surface of the male base board away from the main body, the second plug post is engaged with the guiding groove.

* * * * *